No. 726,427. PATENTED APR. 28, 1903.
W. HAUSSERMANN.
BEER FILTER.
APPLICATION FILED NOV. 3, 1902.
NO MODEL.
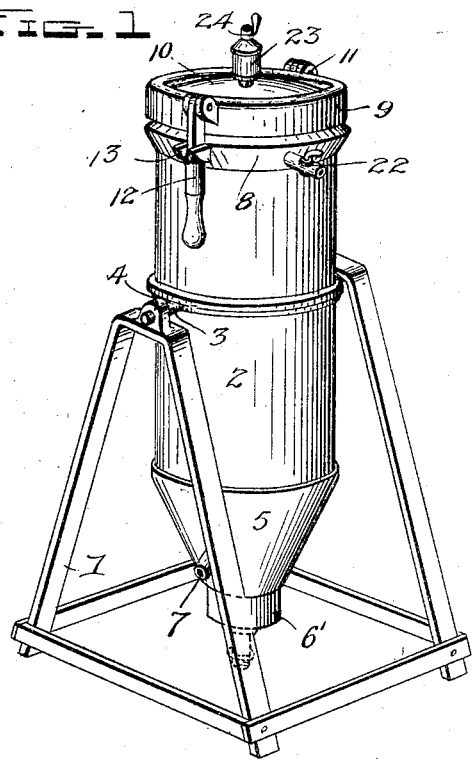
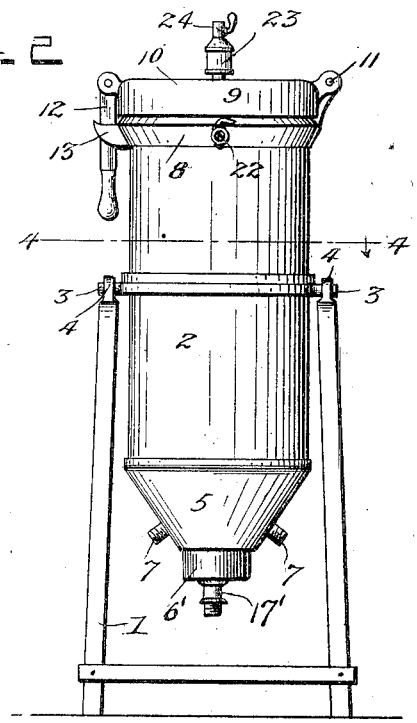
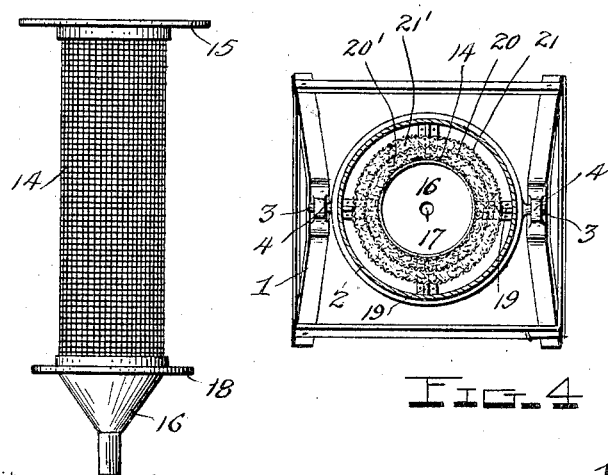
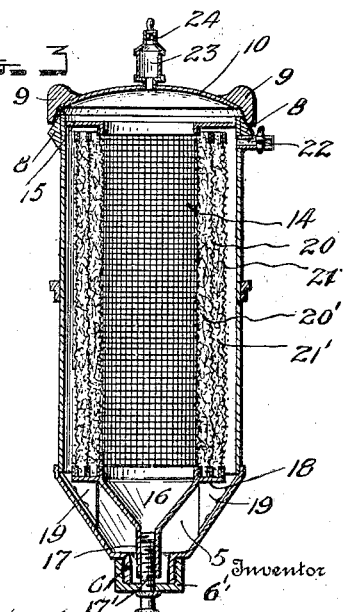
Witnesses
Inventor
W. Haussermann
By H. B. Willson & Co.
Attorneys

UNITED STATES PATENT OFFICE.

WILLIAM HAUSSERMANN, OF CROOKSTON, MINNESOTA.

BEER-FILTER.

SPECIFICATION forming part of Letters Patent No. 726,427, dated April 28, 1903.

Application filed November 3, 1902. Serial No. 129,936. (No model.)

*To all whom it may concern:*

Be it known that I, WILLIAM HAUSSERMANN, a citizen of the United States, residing at Crookston, in the county of Polk and State of Minnesota, have invented certain new and useful Improvements in Beer-Filters; and I do declare the following to be a full, clear, and exact description of the invention, such as will enable others skilled in the art to which it appertains to make and use the same.

This invention relates to improvements in filters, and particularly beer-filters.

The object of the invention is to provide a beer-filter which is simple of construction, comparatively inexpensive of production, efficient in operation, and adapted to be readily and conveniently cleansed of the retained impurities.

With these and other objects in view the invention consists of certain novel features of construction, combination, and arrangement of parts, as will be more fully described, and particularly pointed out in the appended claims.

In the accompanying drawings, Figure 1 is a perspective view of a filter embodying my invention. Fig. 2 is a side elevation of the same. Fig. 3 is a vertical longitudinal section through the casing and screens of the filter. Fig. 4 is a sectional plan view taken on line 4 4 of Fig. 2. Fig. 5 is a view in elevation of the central screen detached.

Referring now more particularly to the drawings, the numeral 1 represents a suitable supporting-frame, and 2 the inclosing casing of the filter, which is preferably cylindrical in form and provided with trunnions 3, journaled in bearings 4 upon the frame, so that the filter may be tilted to any desired convenient angle for the ready insertion and removal of the interior parts.

The body of the casing 2 is constructed of sheet metal and is provided at its lower end with a frusto-conical portion 5, having an outlet-nozzle 6, closed by a screw-cap 6', and one or more inlet-nozzles 7 for the attachment of pipes or conducting-tubes, whereby the beer or liquid to be filtered is conducted from a suitable point of supply to the interior of the filter. The upper end of the casing is provided with an enlarged rim 8, having an inclined surface, against which is adapted to wedge the rim 9 of a cap or cover 10, which rim 9 has a similar inclined surface, whereby when the cap is drawn down the cover will have a water and air tight connection with the body of the casing. The cover is hinged to the body, as shown at 11, and provided with a locking-lever 12, shouldered to fit between and engage lugs or projections 13 on the rim 8, whereby the cover may be held closed.

On the interior of the casing 2 is disposed a central cylindrical screen 14, provided at its upper end with a head or circumferential flange 15 of such size or diameter as to fill the space between it and the wall of the body 2 and bear against said wall to prevent the upwardly-flowing beer or fluid from passing into the space between the top of the screen and the cover 10, whereby the fluid will be caused to flow into said screen through the interposed meshes thereof and filtering material, as hereinafter described. The lower end of the screen is provided with an imperforate discharge-nozzle 16, terminating in a cylindrical extension 17, which is threaded to receive a nipple 17', which projects down through the cap 6' and is designed for attachment to a conducting-pipe, which in practice is employed for conveying the filtered and purified beer to a suitable vat or receptacle. The nozzle 16 has an offstanding circumferential flange or head 18, which is of less diameter than the head 15, and consequently of less diameter than the lower end of the cylindrical body portion of the tank, thus leaving an interposed space for the upward flow of the beer to be filtered and purified.

The head or flange 18 rests upon bracket-plates 19, secured upon the inner sides of the frusto-conical portion 5 of the casing, said brackets being stepped or shouldered to hold the lower end of the screen against movement, while the head 16 supports the upper end thereof in proper position in an obvious manner. Surrounding the screen 14 are intermediate and outer screens 20 and 21, preferably like said screen 14, made of open wire and suitably secured at their upper and lower ends to the heads or flanges 16 and 18, and between the several screens are interposed layers 20' and 21' of filtering material or filtering-cloth, which is packed therein to the density required for use.

The body 2 is provided at its upper end with valved relief-pipes 22, which are opened at the outset of the filtering operation to allow the confined air and foam from the entering beer to discharge, and the cover 10 is provided with a glass gage or sight device 23, provided with a valved nozzle 24. The purpose of this gage is to show when the filter has been completely filled with beer, and in practice the nozzle 24 thereof is opened to provide for the escape of air and foam above the line of the pipes 22, after which the valve in said nozzle is closed to prevent access of air to the filter from without and the escape of the beer therefrom.

In the operation of the invention beer is admitted into the frusto-conical base portion 5 of the casing through the inlet 7 and flows upwardly through the space or passage between the outer screen 21 and wall of the casing under the head or pressure thereon and percolates or filters through said screens and the interposed filtering material 20' and 21'. On its passage through the outer screens and filtering material the beer is thoroughly filtered and relieved of its impurities, and the purified beer passes into the screen 14 and discharges through the nozzle 17 and is conducted by the pipe leading therefrom to a storage tank or vessel provided for its reception.

From the foregoing description, taken in connection with the accompanying drawings, the construction and mode of operation of the invention will be readily understood, and it will be seen that in passing through the screens and filtering material the beer will be readily and quickly purified and that by having the several screens removably mounted within the casing the same may be conveniently removed for cleansing and substitution of new filtering material and a new set of screens substituted therefor to allow the operation of filtering to be continuously carried out.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a beer-filter, the combination of a vertical cylinder-casing provided with a frusto-conical lower end, and a suitable cover for closing its upper end, brackets connected to the frusto-conical lower end, a central filtering-screen extending vertically within the casing and provided at its upper end with a head bearing against the casing and at its lower end with a smaller head of less diameter than the casing and resting on said brackets, a space between said lower head and wall of the casing forming a passage for the upward flow of beer, a beer-inlet pipe connected to the frusto-conical bottom portion of the casing, filtering material surrounding said filtering-screen, and a frusto-conical discharge-nozzle connected to the lower end of the screen and having a nipple projecting through the frusto-conical lower portion of the casing, substantially as described.

2. In a beer-filter, the combination of a vertical cylindrical casing, provided with a suitable closure at its upper end and having a frusto-conical base terminating in a cylindrical extension, a cap closing the extension, brackets upon the interior of said frusto-conical base, a central screen disposed within the casing and provided at its upper end with a head bearing against the wall of the casing, and at its lower end with a head of less diameter than the casing and resting on said brackets, said lower head being formed or provided with a frusto-conical nozzle provided with a nipple projecting through the cap, one or more outer screens surrounding said central screen and supported by the lower head thereof, and filtering material between the screens, substantially as described.

In testimony whereof I have hereunto set my hand in presence of two subscribing witnesses.

WILLIAM HAUSSERMANN.

Witnesses:
ERNST MOUKEL,
CHAS. E. KNIVEL.